United States Patent
Vasudevan

(10) Patent No.: US 8,052,269 B2
(45) Date of Patent: Nov. 8, 2011

(54) JETTABLE INKS WITH REDUCED FROTHING

(75) Inventor: Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 578 days.

(21) Appl. No.: 11/700,594

(22) Filed: Jan. 30, 2007

(65) Prior Publication Data

US 2008/0178762 A1 Jul. 31, 2008

(51) Int. Cl.
*C09D 11/00* (2006.01)
(52) U.S. Cl. ..................... 347/100; 106/31.13
(58) Field of Classification Search .................. 347/100; 106/31.13
See application file for complete search history.

(56) References Cited

U.S. PATENT DOCUMENTS

| | | | |
|---|---|---|---|
| 5,746,818 A * | 5/1998 | Yatake | 106/31.86 |
| 5,852,075 A * | 12/1998 | Held | 523/161 |
| 6,369,750 B1 | 4/2002 | Altavilla et al. | |
| 6,648,956 B1 | 11/2003 | Hechler et al. | |
| 2003/0015119 A1* | 1/2003 | Lee et al. | 106/31.27 |
| 2003/0219553 A1 | 11/2003 | Graindourze et al. | |
| 2004/0061756 A1* | 4/2004 | Kelly-Rowley et al. | 347/100 |
| 2004/0191695 A1 | 9/2004 | Ray et al. | |
| 2004/0249017 A1* | 12/2004 | Vuarnoz et al. | 523/160 |
| 2004/0261658 A1* | 12/2004 | Rehman | 106/31.43 |
| 2006/0007287 A1* | 1/2006 | Cagle et al. | 347/100 |
| 2006/0093732 A1 | 5/2006 | Schut et al. | |

FOREIGN PATENT DOCUMENTS

EP 1243628 A1 * 9/2002

* cited by examiner

*Primary Examiner* — Laura Martin

(57) ABSTRACT

An ink includes a jettable vehicle including a surfactant, and a color component dispersed in the jettable vehicle. According to one exemplary embodiment, the jettable vehicle exhibits a froth half life of less than 100 minutes.

9 Claims, 1 Drawing Sheet

JETTABLE INKS WITH REDUCED FROTHING

BACKGROUND

Ink-jet printing has become a popular way of recording images on various media surfaces, particularly paper, for a number of reasons, including, low printer noise, capability of high-speed recording, and multi-color recording. Additionally, these advantages of ink-jet printing can be obtained at a relatively low price to consumers. Though there has been great improvement in ink-jet printing, improvements are followed by increased demands from consumers for higher speeds, higher resolution, full color image formation, increased stability, etc.

As new ink-jet inks and print engines are developed, several traditional characteristics are considered when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging. The long term reliability without material degradation or nozzle clogging becomes even more important with the advent of print engines that eject smaller drop volumes.

Under certain circumstances, ink formulations may become frothy, degrading the desired ink-jet characteristics. For example, if an ink becomes frothy, precise ink placement may be compromised, ink level readings in the ink reservoir may be inaccurate, and nozzle damage may occur.

SUMMARY

In one aspect of the present system and method, an ink includes a jettable vehicle including a surfactant, and a color component dispersed in the jettable vehicle. According to one exemplary embodiment, the jettable vehicle exhibits a froth half life of less than 100 minutes.

In another aspect of the exemplary system and method an ink includes a jettable vehicle including a fluorosurfactant, and a color component dispersed in the jettable vehicle. According to one exemplary embodiment, the jettable vehicle exhibits a froth half life of less than 100 minutes.

In yet a third exemplary embodiment an ink includes a jettable vehicle including a silicone surfactant and a phosphate surfactant, and a color component dispersed in the jettable vehicle. According to one exemplary embodiment, the jettable vehicle exhibits a froth half life of less than 100 minutes.

BRIEF DESCRIPTION OF THE DRAWINGS

The accompanying drawing illustrates various embodiments of the present exemplary ink formulations and is a part of the specification. The illustrated embodiment is merely an example of the present invention and does not limit the scope of the exemplary system and method.

Throughout the drawing, identical reference numbers designate similar, but not necessarily identical, elements.

DETAILED DESCRIPTION

Figure 1:
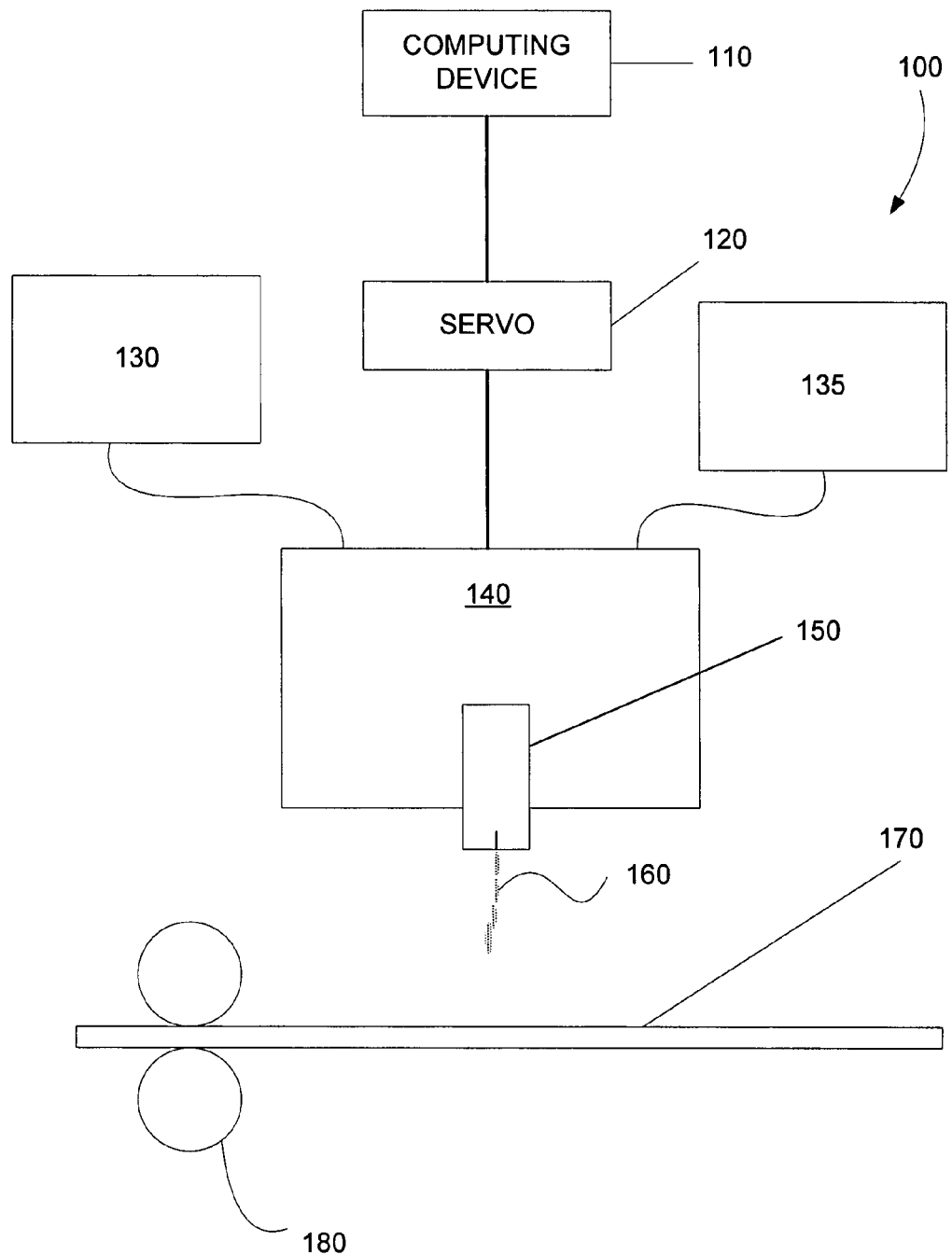
FIG. 1 is a simple block diagram illustrating an ink-jet material dispensing system, according to one exemplary embodiment.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In the present specification, and in the appended claims, the following terminology will be used:

The singular forms "a," "an," and "the" include plural referents unless the context clearly dictates otherwise. Thus, for example, reference to "a pigment" includes reference to one or more of such materials.

The term "about" when referring to a numerical value or range is intended to encompass the values resulting from experimental error that can occur when taking measurements.

As used herein, "liquid vehicle" is defined to include liquid compositions that can be used to carry colorants, including dyes and pigments, to a substrate. Liquid vehicles are well known in the art, and a wide variety of liquid vehicle components may be used in accordance with embodiments of the present exemplary systems and methods. Such liquid vehicles may include a mixture of a variety of different agents, including without limitation, surfactants as described below, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for producing and using ink-jet inks that exhibit reduced frothing. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary system (100) that may be used to apply an ink-jet ink (160) to an ink receiving medium (170), according to one exemplary embodiment. As shown in FIG. 1, the present system includes a computing device (110) controllably coupled through a servo mechanism (120) to a moveable carriage (140) having an ink-jet dispenser (150) disposed thereon. A material reservoir (130) is also coupled to the moveable carriage (140), and consequently to the ink-jet print head (150). A number of rollers (180) are located adjacent to the ink-jet dispenser (150) configured to selectively position an ink receiving medium (170). While the present exemplary system (100) is described in the context of applying an ink-jet ink (160) onto an ink receiving medium (170), the present system and method may be used to mark any number of items with the present ink-jet ink exhibiting reduced frothing. The above-mentioned components of the present exemplary system (100) will now be described in further detail below.

The computing device (110) that is controllably coupled to the servo mechanism (120), as shown in FIG. 1, controls the selective deposition of an ink-jet ink (160) on an ink receiving medium (170). A representation of a desired image or text may be formed using a program hosted by the computing device (110). That representation may then be converted into servo instructions that are then housed in a processor readable medium (not shown). When accessed by the computing device (110), the instructions housed in the processor readable medium may be used to control the servo mechanisms (120) as well as the movable carriage (140) and ink-jet dispenser (150). The computing device (110) illustrated in FIG. 1 may be, but is in no way limited to, a workstation, a personal computer, a laptop, a personal digital assistant (PDA), or any other processor containing device.

The moveable carriage (140) of the present printing system (100) illustrated in FIG. 1 is a moveable material dispenser that may include any number of ink-jet material dispensers (150) configured to dispense the present ink-jet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as, provide the user with a user interface.

As an image or text is printed on an ink receiving medium (170), the computing device (110) may controllably position the moveable carriage (140) and direct one or more of the ink-jet dispensers (150) to selectively dispense an ink-jet ink at predetermined locations on ink receiving medium (170) as digitally addressed drops, thereby forming the desired image or text. The ink-jet material dispensers (150) used by the present printing system (100) may be any type of ink-jet dispenser configured to perform the present method including, but in no way limited to, thermally actuated ink-jet dispensers, mechanically actuated ink-jet dispensers, electrostatically actuated ink-jet dispensers, magnetically actuated dispensers, piezoelectrically actuated dispensers, continuous ink-jet dispensers, etc.

The material reservoir (130) that is fluidly coupled to the ink-jet material dispenser (150) houses the present ink-jet ink (160) prior to printing. The material reservoir may be any container configured to hermetically seal the ink-jet ink (160) prior to printing and may be constructed of any number of materials including, but in no way limited to metals, plastics, composites, or ceramics. As illustrated in FIG. 1, the material reservoir (130) may be separate from, yet fluidly coupled to the ink-jet material dispenser (150). Alternatively, the material reservoir (130) may be directly coupled to and form a part of the ink-jet material dispenser (150).

FIG. 1 also illustrates the components of the present system that facilitate reception of the ink-jet ink (160) onto the ink receiving medium (170). As shown in FIG. 1, a number of positioning rollers (180) may transport and/or positionally secure an ink receiving medium (170) during a printing operation. Alternatively, any number of belts, rollers, substrates, or other transport devices may be used to transport and/or postionally secure the ink receiving medium (170) during a printing operation, as is well known in the art.

As mentioned, under certain circumstances, ink formulations may become frothy, degrading the desired ink-jet quality characteristics. The formation and composition of an ink-jet ink (160) showing reduced tendencies to froth will now be described in detail below.

Exemplary Composition

In accordance with the present system and method, a system for printing images on a substrate can include an ink-jet ink (160) and a printhead or other material dispenser (150) loaded with the ink-jet ink. The ink-jet ink includes a color component such as a pigment or a dye, and a liquid vehicle including water, co-solvents, surfactants, buffering agents, biocides, sequestering agents, viscosity modifiers, humectants, binders, and/or other known additives. In one exemplary aspect of the present system and method, the liquid vehicle can comprise from about 70 wt % to about 99 wt % of the ink-jet ink composition. According to one exemplary embodiment described below, variation of the surfactants included in the liquid vehicle can reduce the tendency of the resulting ink-jet ink formulation to froth. The ingredients that can be present in the ink-jet inks (160) in accordance with embodiments of the present exemplary systems and methods include colorants such as pigment solids or dyes, and a liquid vehicle including specific surfactant combinations, as will be discussed in further detail below.

Color Component

According to one exemplary embodiment, the present exemplary inkjet ink system includes between approximately 0.1 to 6% colorant by volume. Specifically, the present exemplary inkjet ink system may include a number of anionic or cationic dyes and/or pigments or dye/pigment blends.

Examples of suitable anionic dyes include a large number of water-soluble acid and direct dyes. Specific examples of anionic dyes Direct Yellow 86, Acid Red 249), Direct Blue 199, Direct Black 168, Direct Yellow 132; Aminyl Brilliant Red F-B (Sumitomo Chemical Co.); Reactive Black 31, Direct Yellow 157, Reactive Yellow 37, Acid Yellow 23, Reactive Red 180, Acid Red 52, Acid Blue 9; mixtures thereof; and the like. Further examples include Direct Red 227, Acid Yellow 17, Bernacid Red 2BMN, Pontamine Brilliant Bond Blue A, BASF X-34, Pontamine, Food Black 2, Direct Blue 86, Reactive Red 4, Reactive Red 56, Levafix Brilliant Red E-4B (Mobay Chemical), Levafix Brilliant Red E-6BA (Mobay Chemical), Pylam Acid Red 92, Direct Brill Pink B Ground Crude (Crompton & Knowles), Cartasol Yellow GTF Presscake (Sandoz, Inc.), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof; and the like. This list is intended to be merely exemplary, and should not be considered limiting. Additionally, while a number of suitable anionic dyes are provided above, any number of cationic dyes may also be used.

Similarly, suitable pigments can be black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue ($CoO$—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, diketopyrrolopyrrole pigments and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138, Pigment Yellow 155, Pigment Yellow 83, and Pigment Yellow 213. Such pigments are commercially available in either powder or press cake form from a number of sources including, BASF Corporation, Engelhard Corporation and Sun Chemical Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present system and method, therefore the following listing is not intended to be limiting. For example, colored pigments can be blue, brown, cyan, green, white, violet, magenta, red, orange, yellow, as well as mixtures thereof. The following color pigments are available from Cabot Corp.: CABO-JET 250C, CABO-JET 260M, and CABO-JET 270Y. The following color pigments are available from BASF Corp.: PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901 F, HELIOGEN Blue NBD 7010, HELIOGEN Blue K 7090, HELIOGEN Blue L 7101 F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOS- TAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300. These pigments are available from commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson. Examples of other suitable colored pigments are described in the Colour Index, 3rd edition (The Society of Dyers and Colourists, 1982).

Other pigments not specifically listed can also be suitable for use with the present exemplary system. The above-illustrated pigments can be used singly or in combination of two or more, or in combination with anionic or nonionic dyes. Typically, the pigments of the present system and method can be from about 10 nm to about 10 μm and in one aspect can be from 10 nm to about 500 nm in diameter, although sizes outside this range can be used if the pigment can remain dispersed and provide adequate color properties. In one detailed aspect of the present system and method, the pigment can comprise from about 1% to about 6% by weight of the inkjet ink composition.

Liquid Vehicle Components

As described previously, a liquid vehicle can be used to carry the colorant component that may be present in the ink-jet ink compositions of the present exemplary system and method. More specifically, the liquid vehicle can include any number of components including, but in no way limited to, water, co-solvents, surfactants, buffering agents, biocides, sequestering agents, viscosity modifiers, humectants, binders, and/or other known additives. Examples of each exemplary component will be provided below.

With respect to the co-solvent content of the liquid vehicle, co-solvents for use in the present system and method include, but are in no way limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and/or ketones. For example, according to one exemplary embodiment, co-solvents can include, but are in no way limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

Specific examples of co-solvents that may be employed in the practice of the present system and method include, but are not limited to, 1,5-pentanediol, 2-pyrrolidone, propylene glycol n-butyl ether, Liponic ethylene glycol 1, Liponic ethylene glycol 7, 2-methyl-2,4-pentanediol, 2-methyl-1,3-propanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink to minimize clogging or other properties of the ink such as viscosity, pH, surface tension, optical density, and print quality.

Other additives, such as ammonium salts and other salts, can also be included, such as at from 0.1 wt % to 4 wt % in one embodiment. Examples of such salts include ammonium acetate, ammonium sulfate, ammonium benzoate, potassium acetate, sodium acetate, sodium xylene sulfonate, potassium tartrate, sodium tartrate, lithium tartrate Various buffering agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid, nitric acid, hydrochloric acid, acetic acid, sulfuric acid; amines such as triethanolamine, diethanolamine, and dimethylethanolamine; and other basic or acidic components. If used, buffering agents typically comprise less than about 10 wt % of the ink-jet ink composition.

In another exemplary aspect of the present system and method, various biocides can be used to inhibit growth of undesirable microorganisms. Several examples of suitable biocides include, but are in no way limited to, benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

In an additional exemplary aspect of the present system and method, binders can be included which act to secure the colorants on the substrate. Binders suitable for use in the present system and method typically have a molecular weight of from about 100 to about 50,000 g/mole. Non-limiting examples include: polyester, polyester-melanine, polyvinylpyrrolidinone, polyethylene glycols and ethers thereof, polysulfones, polyamide, polyvinyl ethers, polyethylene oxides, styrene-acrylimide copolymers and salts thereof, dimethylamino diethyl acrylates, copolymers of dialkylamino ethyl acrylates and methacrylates with styrene or vinyl ethers, styrene-maleimide copolymers and salts thereof, styrene-maleamic acid-alkyl acrylate copolymers and salts thereof, vinyl naphthalene-copolymers with acrylimide or acrylamide and salts thereof, vinyl naphthalene-maleimide copolymers and salts thereof, vinyl naphthalene-maleamic acid copolymers, and salts thereof. If the binder is in a particulate dispersed form, then it is not considered to be part of the liquid vehicle, but is considered to be carried by liquid vehicle.

In one exemplary aspect of the present system and method, the ink-jet ink composition includes surfactants. Surfactants are traditionally included in ink-jet ink compositions to provide various benefits such as lower surface tensions, enhance wetting, etc. However, the inclusion of surfactants may lead to the undesired frothing of inks. While both pigment based inks and dye based inks froth, pigment based inks appear to be especially plagued with frothing; which is especially problematic in off-axis printing systems.

Traditional ink-jet ink formulations include a fluorosurfactant such as Zonyl FSO. However, it was found that the relatively high levels of such nonionic fluorosurfactant actually caused potential frothing issues with the ink. Reduction in the amount of fluorosurfactant present in the liquid vehicle, and even replacement of the fluorosurfactant greatly reduced the frothing of the resulting ink. According to one exemplary embodiment, the fluorosurfactant is reduced to between approximately 0.10% and 0.20% of the liquid vehicle. According to yet another exemplary system and method, the surfactant component of the present liquid vehicle component includes a combination of a silicone surfactant and a phosphate surfactant replacing the traditional fluorosurfactant and non-ionic surfactant. As illustrated in the examples below, reduction of the fluorosurfactant and/or replacement of the fluorosurfactant and non-ionic surfactant with a phosphate surfactant and a nonionic siloxane surfactant greatly reduces the frothing of the resulting jettable ink.

Illustrative Examples

The following example illustrates the embodiments of the system and method that are presently best known. However, it is to be understood that the following is only exemplary or illustrative of the application of the principles of the present system and method. Numerous modifications and alternative compositions, methods, and systems may be devised by those skilled in the art without departing from the spirit and scope of the present system and method. The appended claims are intended to cover such modifications and arrangements. Thus, while the present system and method has been described above with particularity, the following example provides further detail in connection with what is presently deemed to be the most practical and preferred embodiments of the present system and method.

According to the present example, the froth half lives of cyan (C), magenta (M), and yellow (Y) dispersions in two different vehicles I and II were tested. According to the present example, the smaller the half-life value, the sooner the froth dissipated and the better the ink for intended use.

According to the present experiment, the composition of vehicle I and vehicle II are illustrated below in Tables 1 and 2, respectively.

TABLE 1

Vehicle I

| MATERIAL | Wt % |
|---|---|
| Diethylene Glycol | 2.00% |
| 1,2,-hexanediol | 4.00% |
| Glycerine | 5.00% |
| Ethoxylated Glycerol-1 (EG-1) | 5.00% |
| Tergitol 15-S-7 | 1.00% |
| Zonyl FSO | 0.20% |
| Proxel GXL | 0.20% |
| Pigment dispersion | 3-4% |
| DI Water | Balance |

TABLE 2

Vehicle II

| MATERIAL | % |
|---|---|
| Tripropylene glycol | 7.00% |
| 1-(2-Hydroxyethyl)-2-imidazolidinone | 5.00% |
| 1-(2-Hydroxyethyl)-2-pyrrolidone | 6.00% |
| Ethoxylated Glycerol-1 (EG-1) | 3.00% |
| Tergitol 15-S-7 | 0.75% |
| Zonyl FSO | 0.10% |
| Proxel GXL | 0.20% |
| EDTA-disodium salt | 0.05% |
| Pigment dispersion | 3-4% |
| DI Water | Balance |

As illustrated in Tables 1 and 2, both of vehicles I and II included a pigment dispersion of between 3 and 4%. In each of the above-mentioned vehicles, two different foam control agents (GPE=Glycerol ethoxylate-co-propoxylate triol, CAS# 51258-15-2, and GEP=Glycerol propoxylate-block-ethoxylate, CAS# 9082-00-2) were added, in addition to a reduction of the nonionic fluorosurfactant Zonyl FSO, replacement of the Zonyl FSO with a phosphate fluorosurfactant (Zonyl UR), and replacement of the nonionic surfactant Tergitol 15-S-7 with a nonionic siloxane surfactant (Silwet L7650). With each of the above-mentioned combinations, the resulting ink-jet ink was dispensed and the frothing characteristics such as the froth half life ($t_{1/2}$), or the time for half of the observable froth to dissipate, were observed. The results of the above-mentioned experiment were recorded and are illustrated in Table 3 below.

TABLE 3

| Vehicle I | $t_{1/2}$ (min.) | Vehicle II | $t_{1/2}$ (min.) |
|---|---|---|---|
| Cyan Control | 180 | Cyan Control | 686 |
| Ctrl + 2% GEP | 133 | Ctrl + 2% GEP | 795 |
| Ctrl + 2% GPE | 173 | Ctrl + 2% GPE | 377 |
| Ctrl + Silwet L7650 (but only 0.05% Zonyl FSO) | 74 | Ctrl + Silwet L7650 | 1600 |
| Ctrl + Sil - T15S7 | 77 | Ctrl + Sil - T15S7 | 200 |
| UR for FSO | 54 | UR for FSO | 77 |
| UR for FSO and Sil for T15S7 | 50 | UR for FSO and Sil for T15S7 | 3 |
| Magenta Control | 475 | Magenta Control | 2415 |
| Ctrl + 2% GEP | 4765 | Ctrl + 2% GEP | 2415 |
| Ctrl + 2% GPE | 388 | Ctrl + 2% GPE | 4764 |
| Ctrl + Silwet L7650 (but only 0.05% Zonyl FSO) | 70 | Ctrl + Silwet L7650 | 800 |
| Ctrl + Sil - T15S7 | 77 | Ctrl + Sil - T15S7 | 760 |
| UR for FSO | 44 | UR for FSO | 86 |
| UR for FSO and Sil for T15S7 | 43 | UR for FSO and Sil for T15S7 | 1 |
| Control yellow + SilwetL7650 (but only 0.05% Zonyl FSO) | 95 | Control yellow + Silwet L7650 | 256 |
| Control yellow + Sil - T15S7 | 95 | Control Yellow + Sil - T15S7 | 2200 |

TABLE 3-continued

| Vehicle I | $t_{1/2}$ (min.) | Vehicle II | $t_{1/2}$ (min.) |
|---|---|---|---|
| UR for FSO | 51 | UR for FSO | 70 |
| UR for FSO and Sil for T15S7 | 38 | UR for FSO and Sil for T15S7 | 25 |

As illustrated in Table 3, the addition of the different foam control agents (GPE and GEP) did not significantly impact the froth characteristics of the resulting ink. In contrast, when the amount of the fluorosurfactant Zonyl FSO in the formulation was reduced, the $t_{1/2}$ improved tremendously. The same result was achieved when Zonyl FSO was replaced with a phosphate based fluorosurfactant Zonyl UR along with replacement of the nonionic surfactant Tergitol 15S7 with Silwet L7650, a nonionic siloxane surfactant.

In conclusion, the present system and method for producing ink-jet ink formulations having improved froth characteristics include reducing the use of a nonionic fluorosurfactant or completely replacing the nonionic fluorosurfactant and the other non-ionic surfactant component of the liquid vehicle with a phosphate fluorosurfactant and a nonionic siloxane surfactant. As demonstrated above, the modifications to the surfactant components of the liquid vehicle greatly reduces the frothing of the resulting jettable ink.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A method for forming an inkjet ink with reduced foaming characteristics, said method comprising:
   providing a jettable vehicle comprising a colorant;
   selecting a combination of surfactants to produce a foaming half-life of said inkjet ink which is less than 100 minutes, said combination of surfactants comprising at least two of an ethoxylated nonionic fluorosurfactant, a nonionic alcohol ethoxylate surfactant, and an anionic phosphate fluorosurfactant, provided that said combination of surfactants results in a foaming half life of said inkjet ink which is less than 100 minutes; and
   combining said combination of surfactants with said jettable vehicle to produce said inkjet ink with reduced foaming characteristics.

2. The method of claim 1, in which selecting a combination of surfactants such that said foaming half-life of said inkjet ink is less than 100 minutes comprises selecting a measurable amount of
   up to approximately 0.2% wt of said ethoxylated nonionic fluorosurfactant; and
   up to approximately 0.2% wt of said anionic phosphate fluorosurfactant;
   wherein the total amount of fluorosurfactants do not exceed approximately 0.2 wt%.

3. The method of claim 1, in which said combination of surfactants comprises:
   approximately 0.05% wt. of said ethoxylated nonionic fluorosurfactant; and
   approximately 1% wt. of said nonionic alcohol ethoxylate surfactant.

4. The method of claim 1, in which said combination of surfactants comprises:
   approximately 1% wt. of said nonionic alcohol ethoxylate surfactant; and
   approximately 0.2% wt. of said anionic phosphate fluorosurfactant.

5. The ink of claim 1, in which said combination of surfactants are between approximately 0.85% wt. and 1.25% wt. of said inkjet ink.

6. The ink of claim 1, in which said ethoxylated nonionic fluorosurfactant comprises a maximum of 0.05% wt of said inkjet ink.

7. The ink of claim 1, wherein said foaming half-life of said inkjet ink is less than 75 minutes.

8. The ink of claim 1, wherein said foaming half-life of said inkjet ink is less than 50 minutes.

9. The method of claim 1, in which selecting a combination of surfactants such that said foaming half-life of said inkjet ink is less than 100 minutes comprises selecting a measurable amount of up to approximately 1% wt. of said nonionic alcohol ethoxylate surfactant and up to approximately 0.2% wt of said anionic phosphate fluorosurfactant.

* * * * *

UNITED STATES PATENT AND TRADEMARK OFFICE
CERTIFICATE OF CORRECTION

| | | |
|---|---|---|
| PATENT NO. | : 8,052,269 B2 | Page 1 of 1 |
| APPLICATION NO. | : 11/700594 | |
| DATED | : November 8, 2011 | |
| INVENTOR(S) | : Sundar Vasudevan | |

It is certified that error appears in the above-identified patent and that said Letters Patent is hereby corrected as shown below:

In column 11, line 41, in Claim 1, delete "of" and insert -- of: --, therefor.

Signed and Sealed this
Twenty-fifth Day of September, 2012

David J. Kappos
*Director of the United States Patent and Trademark Office*